(12) United States Patent
Lyu et al.

(10) Patent No.: US 12,545,634 B2
(45) Date of Patent: Feb. 10, 2026

(54) METHOD FOR PREPARING ACRYLIC ACID

(71) Applicant: LG CHEM, LTD., Seoul (KR)

(72) Inventors: Byeong Gil Lyu, Daejeon (KR); Mi Kyung Kim, Daejeon (KR); Eun Kyo Kim, Daejeon (KR); Hye Bin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 191 days.

(21) Appl. No.: 18/265,491

(22) PCT Filed: Jun. 16, 2022

(86) PCT No.: PCT/KR2022/008576
§ 371 (c)(1),
(2) Date: Jun. 6, 2023

(87) PCT Pub. No.: WO2023/063526
PCT Pub. Date: Apr. 20, 2023

(65) Prior Publication Data
US 2024/0043368 A1 Feb. 8, 2024

(30) Foreign Application Priority Data
Oct. 15, 2021 (KR) .................. 10-2021-0137936

(51) Int. Cl.
C07C 51/487 (2006.01)
C07C 51/377 (2006.01)
C07C 51/48 (2006.01)

(52) U.S. Cl.
CPC .......... *C07C 51/487* (2013.01); *C07C 51/377* (2013.01); *C07C 51/48* (2013.01)

(58) Field of Classification Search
CPC ..... C07C 51/487; C07C 51/377; C07C 51/48; C07C 51/43; C07C 51/44; C07C 57/04
See application file for complete search history.

(56) References Cited

U.S. PATENT DOCUMENTS

2004/0260122 A1    12/2004   Yada et al.
2017/0174604 A1    6/2017    Decourcy
(Continued)

FOREIGN PATENT DOCUMENTS

CN    101255109 A    9/2008
CN    101260035 A    9/2008
(Continued)

OTHER PUBLICATIONS

Machine translation of KR 2017-0113177. (Year: 2017).*
(Continued)

*Primary Examiner* — Deborah D Carr
(74) *Attorney, Agent, or Firm* — Bryan Cave Leighton Paisner LLP

(57) ABSTRACT

Provided is a method for preparing an acrylic acid including: dehydrating a lactic acid aqueous solution in a reaction unit to prepare a reaction product stream; passing the reaction product stream through a cooling unit and a refining unit sequentially and supplying a discharge stream from the refining unit to an acrylic acid separation column; and separating an unreacted lactic acid as a side discharge stream and separating the acrylic acid as an upper discharge stream in the acrylic acid separation column.

11 Claims, 1 Drawing Sheet

(56) References Cited

U.S. PATENT DOCUMENTS

| | | |
|---|---|---|
| 2017/0283358 A1 | 10/2017 | Jain et al. |
| 2017/0362156 A1 | 12/2017 | Binder et al. |
| 2019/0071382 A1 | 3/2019 | Fauconet et al. |
| 2019/0083923 A1 | 3/2019 | Song et al. |
| 2020/0385329 A1 | 12/2020 | Hoyme et al. |

FOREIGN PATENT DOCUMENTS

| | | | | |
|---|---|---|---|---|
| CN | 106061934 | A | | 10/2016 |
| CN | 110099889 | A | | 8/2019 |
| CN | 113461915 | A | | 10/2021 |
| CN | 214436602 | U | | 10/2021 |
| CN | 115124417 | A | | 9/2022 |
| JP | H07503490 | A | | 4/1995 |
| JP | 2014-189510 | | | 10/2014 |
| JP | 2014189510 | A | * | 10/2014 |
| JP | 2017509613 | A | | 4/2017 |
| JP | 6574838 | | | 9/2019 |
| JP | 2020502209 | A | | 1/2020 |
| KR | 10-2016-0122749 | | | 10/2016 |
| KR | 10-2017-0113177 | | | 10/2017 |
| KR | 20170113177 | A | * | 10/2017 ........... C07C 51/235 |
| KR | 10-2018-0064432 | | | 6/2018 |
| KR | 10-2080287 | | | 2/2020 |
| WO | 2003-031384 | | | 4/2003 |
| WO | 2006025478 | A1 | | 3/2006 |
| WO | 2007088767 | A1 | | 8/2007 |

OTHER PUBLICATIONS

Machine translation of JP 2014-189510 (Year: 2014).*

Woo et al.,"Recovery of Lactic Acid Using Reactive Dividing Wall Column," Korean Chem. Eng. Res., 48(3):342-349 (2010) [English Language Machine Translation and original document in Korean], 16 pages.

* cited by examiner

【FIG. 1】
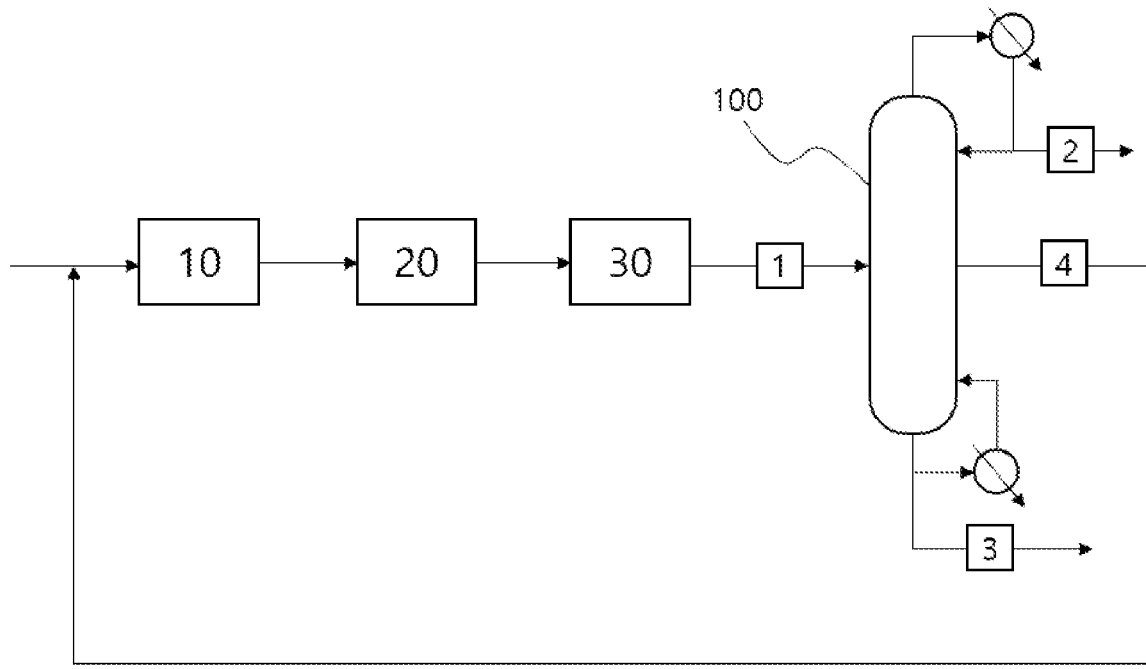
【FIG. 2】
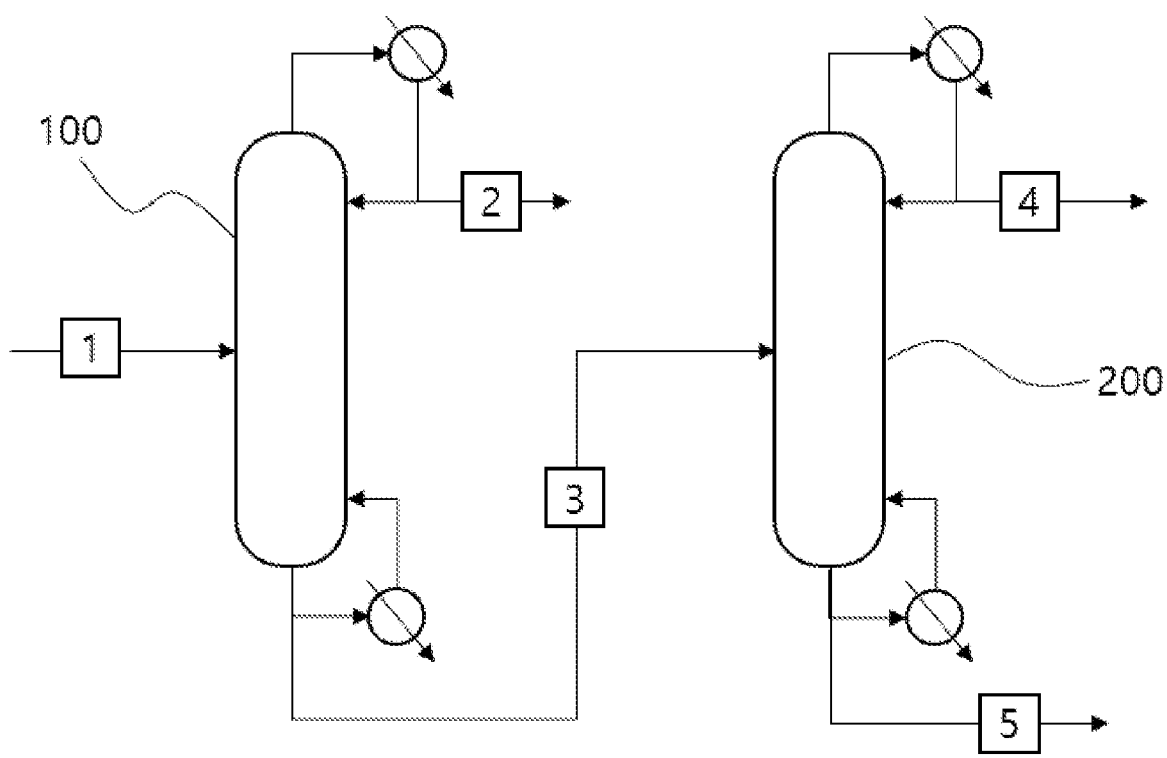

METHOD FOR PREPARING ACRYLIC ACID

CROSS-REFERENCE TO RELATED APPLICATIONS

This application is a National Stage Application of International Application No. PCT/KR2022/008576 filed on Jun. 16, 2022, which claims the benefit of and priority to Korean Patent Application No. 10-2021-0137936, filed on Oct. 15, 2021, the entire contents of which are incorporated herein as a part of the specification.

TECHNICAL FIELD

The present invention relates to a method for preparing an acrylic acid, and more particularly, to a method for preparing an acrylic acid by a dehydration reaction of a lactic acid, which effectively removes by-products while reducing an acrylic acid loss.

BACKGROUND

An acrylic acid is used as a polymer raw material used in fiber, adhesives, paint, fiber processing, leather, building materials, and the like, and its demand is growing. In addition, the acrylic acid is also used as a raw material of an absorbent resin and is industrially used a lot in absorbent articles such as paper diapers and sanitary napkins, agricultural and horticultural water retaining agents, industrial water stop materials, and the like.

A conventional method for preparing an acrylic acid is generally a method of oxidizing propylene in the air, but the method is a method of converting propylene into acrolein by a gaseous contact oxidation reaction and subjecting the acrolein to a gaseous contact oxidation reaction to prepare an acrylic acid, and the method produces an acetic acid as a by-product, which is difficult to separate from the acrylic acid. In addition, the method for preparing an acrylic acid using propylene uses propylene obtained by refining crude oil which is a fossil resource, as a raw material, and considering problems such as a recent rise in crude oil prices or global warming, the method has a problem in terms of raw material costs or environmental pollution.

Thus, a study on a method for preparing an acrylic acid from a carbon-neutral biomass raw material was conducted. For example, there is a method for preparing an acrylic acid (AA) by a gaseous dehydration reaction of a lactic acid (LA). This method is generally a method for preparing an acrylic acid by an intramolecular dehydration reaction of a lactic acid in the presence of a catalyst at a high temperature of 300° C. or higher. A reaction product including an acrylic acid is produced by the dehydration reaction of a lactic acid, and an unreacted lactic acid is included in the reaction product depending on a conversion rate. When an unreacted lactic acid is included in the reaction product, the economic feasibility of the process can be improved only by recovering the lactic acid in a separation process. However, since the lactic acid is rapidly oligomerized at a high concentration at a high temperature, it is difficult to recover the lactic acid.

BRIEF DESCRIPTION

Technical Problem

An object of the present invention is to provide a method of effectively recovering an unreacted lactic acid from a reaction product produced by preparing an acrylic acid by a dehydration reaction of a lactic acid, and reusing the lactic acid, in order to solve the problems mentioned in the Background.

Technical Solution

In one general aspect, provided is a method for preparing an acrylic acid, the method including: dehydrating a lactic acid aqueous solution in a reaction unit to prepare a reaction product stream; passing the reaction product stream through a cooling unit and a refining unit sequentially and supplying a discharge stream from the refining unit to an acrylic acid separation column; and separating an unreacted lactic acid as a side discharge stream and separating the acrylic acid as an upper discharge stream in the acrylic acid separation column.

Advantageous Effects

According to the method for preparing an acrylic acid of the present invention, in recovering a lactic acid from a reaction product including an acrylic acid, a recovery rate of an unreacted lactic acid can be increased by controlling the amount of exposure time to a high temperature in a high concentration state to minimize an oligomerization reaction of a lactic acid.

DESCRIPTION OF THE DRAWINGS

FIG. 1 is a process flow diagram of a method for preparing an acrylic acid according to an exemplary embodiment of the present invention.

FIG. 2 is a process flow diagram according to a method for preparing an acrylic acid in the comparative example.

DETAILED DESCRIPTION

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions.

The term "stream" in the present invention can refer to a fluid flow in a process, or can refer to a fluid itself flowing in a pipe. Specifically, the stream can refer to both a fluid itself flowing in a pipe connecting each device and a fluid flow. In addition, the fluid can include any one or more components of gas, liquid, and solid.

Hereinafter, the present invention will be described in more detail for better understanding of the present invention, with reference to FIG. 1.

According to the present invention, a method for preparing an acrylic acid is provided. More specifically, the method can include: dehydrating a lactic acid aqueous solution in a reaction unit 10 to prepare a reaction product stream; passing the reaction product stream through a cooling unit 20 and a refining unit 30 sequentially and supplying a discharge stream from the refining unit 30 to an acrylic acid separation column 100; and separating an unreacted lactic acid as a side discharge stream and separating the acrylic acid as an upper discharge stream in the acrylic acid separation column 100.

Specifically, a conventional method for preparing an acrylic acid is generally a method of oxidizing propylene in the air, but the method is a method of converting propylene into acrolein by a gaseous contact oxidation reaction and subjecting the acrolein to a gaseous contact oxidation reaction to prepare an acrylic acid, and the method produces an acetic acid as a by-product, which is difficult to separate from the acrylic acid. In addition, the method for preparing an acrylic acid using propylene uses propylene obtained by refining crude oil which is a fossil resource, as a raw material, and considering problems such as a recent rise in crude oil prices or global warming, the method has a problem in terms of raw material costs or environmental pollution.

In order to solve the problems of the conventional method for preparing an acrylic acid, a study on a method for preparing an acrylic acid from a carbon-neutral biomass raw material was conducted. For example, there is a method for preparing an acrylic acid (AA) by a gaseous dehydration reaction of a lactic acid (LA). This method is generally a method for preparing an acrylic acid by an intramolecular dehydration reaction of a lactic acid in the presence of a catalyst at a high temperature. A reaction product including an acrylic acid is produced by the dehydration reaction of a lactic acid, and an unreacted lactic acid is included in the reaction product depending on a conversion rate. When an unreacted lactic acid is included in the reaction product, the economic feasibility of the process can be improved only by recovering the lactic acid in a separation process. However, since the lactic acid is rapidly oligomerized at a high concentration at a high temperature, it is difficult to recover the lactic acid.

For this, in the present invention, in order to solve the conventional problems, a method of separating a lactic acid from a reaction product including an acrylic acid prepared by the dehydration reaction of a lactic acid, in which a time that a high concentration of a lactic acid is exposed to a high temperature is shortened to prevent oligomerization of a lactic acid, thereby improving a recovery rate of an unreacted lactic acid, is to be provided.

According to an exemplary embodiment of the present invention, a lactic acid aqueous solution is supplied to the reaction unit 10 and a dehydration reaction is performed to prepare a reaction product including an acrylic acid. Here, the dehydration reaction can be performed as a gas phase reaction in the presence of a catalyst. For example, the concentration of the lactic acid in the lactic acid aqueous solution can be 10 wt % or more, 20 wt % or more, or 30 wt % or more and 40 wt % or less, 50 wt % or less, 60 wt % or less, or 70 wt % or less. When the lactic acid is present at a high concentration, oligomers such as dimers and trimers are formed by an equilibrium reaction, so that the lactic acid can be used in the form of an aqueous solution having the concentration in the above range.

The reactor can include a reactor capable of a common dehydration reaction of a lactic acid, the reactor can include a reaction tube filled with a catalyst, and while a reaction gas including volatile components of a lactic acid aqueous solution as a raw material is passed through the reaction tube, a lactic acid can be dehydrated by a gaseous contact reaction to produce an acrylic acid. The reaction gas can further include any one or more dilution gases of water vapor, nitrogen gas, and air for adjusting a concentration, in addition to the lactic acid.

Operation conditions of the reactor can be common dehydration reaction conditions of a lactic acid. Here, the operation temperature of the reactor can refer to a set temperature of a heating medium or the like used for controlling the temperature of the reactor.

A catalyst used in the dehydration reaction of the lactic acid can include, for example, one or more selected from the group consisting of sulfate-based catalysts, phosphate-based catalysts, and nitrate-based catalysts. As a specific example, the sulfate can include $Na_2SO_4$, $K_2SO_4$, $CaSO_4$, and $Al_2(SO_4)_3$, the phosphate can include $Na_3PO_4$, $Na_2HPO_4$, $NaH_2PO_4$, $K_3PO_4$, $K_2HPO_4$, $KH_2PO_4$, $CaHPO_4$, $Ca_3(PO_4)_2$, $AlPO_4$, $CaH_2P_2O_7$, and $Ca_2P_2O_7$, and the nitrate can include $NaNO_3$, $KNO_3$, and $Ca(NO_3)_2$. In addition, the catalyst can be supported on a support. The support can include one or more selected from the group consisting of, for example, diatomaceous earth, alumina, silica, titanium dioxide, carbides, and zeolite.

The reaction product prepared by the dehydration reaction of the lactic acid can further include water ($H_2O$), gas by-products, low-boiling point by-products, high-boiling point by-products, and an unreacted lactic acid, in addition to the acrylic acid which is a desired product.

The method for preparing an acrylic acid by the dehydration reaction of the lactic acid can secure raw material competitiveness as compared with a conventional method of oxidizing propylene in the air and solve the problem of environmental pollution, but the conversion rate of the lactic acid is low and various by-products are produced to lower the yield of an acrylic acid. Therefore, it is necessary to develop a process for improving economic feasibility. For this, in the present invention, a method for improving economic feasibility by increasing the recovery rate of an unreacted lactic acid is provided.

According to an exemplary embodiment of the present invention, the reaction product stream is passed through a cooling unit 20 and a refining unit 30 sequentially, and a discharge stream from the refining unit 30 can be supplied to an acrylic acid separation column 100 to recover a lactic acid.

According to an exemplary embodiment of the present invention, the cooling unit 20 can include one or more cooling towers, and the reaction product stream can be supplied to the cooling tower and cooled. Specifically, the reaction product prepared by the dehydration reaction of the lactic acid is a gas phase and can be condensed through the cooling tower. Gas by-products can be separated to the upper portion of the cooling tower and a liquid condensate can be discharged to the lower portion of the cooling tower, and the condensate can be supplied to the refining unit 30 at the rear end. Here, the gas by-products can include water, carbon monoxide, carbon dioxide, dilution gas, acetaldehyde, and the like as gas components.

According to an exemplary embodiment of the present invention, the refining unit 30 can include a water separation column and a low-boiling point separation column. For example, the water separation column can separate water from a reaction product by distillation or extraction.

When water is separated from the reaction product by extraction in the water separation column, a separate extractant is supplied to the water separation column, and the acrylic acid included in the reaction product stream can be separated as the upper discharge stream from the water separation column, using the extractant. In addition, a step for recovering the extractant can be further performed.

The extractant can include one or more selected from the group consisting of, for example, benzene, toluene, xylene, n-heptane, cycloheptane, cycloheptene, 1-heptene, ethylbenzene, methylcyclohexane, n-butylacetate, isobutylacetate, isobutylacrylate, n-propylacetate, isopropylacetate, methylisobutylketone, 2-methyl-1-heptene, 6-methyl-1-heptene, 4-methyl-1-heptene, 2-ethyl-1-hexene, ethylcyclopentane, 2-methyl-1-hexene, 2,3-dimethylpentane, 5-methyl-1-hexene, and isopropylbutylether. As a specific example, the extractant can be toluene.

A method of supplying the extractant to the water separation column and performing extraction can be any known method, and for example, any method such as cross current, counter current, and co-current can be used without particular limitation.

The reaction product stream and the extractant can be brought into contact in the water separation column, thereby separating an extract and an extraction residue solution. For example, the extract can be an acrylic acid dissolved in the extractant, and the extract can be discharged as an upper discharge stream from the water separation column. Here, the upper discharge stream from the water separation column can be supplied to a low-boiling point separation column after removing the extractant.

In addition, the extraction residue solution is wastewater including water and can be separated as a lower discharge stream from the water separation column. Here, aqueous by-products can be separated together with water in the lower portion of the water separation column and discharged.

The upper discharge stream from the water separation column is supplied to the low-boiling point separation column and low-boiling point by-products can be removed by distillation, and a reaction product from which the low-boiling point by-products have been removed can be discharged as the lower discharge stream from the low-boiling point separation column. Here, the discharge stream from the refining unit 30 supplied to the acrylic acid separation column 100 can be the lower discharge stream from the low-boiling point separation column.

The reaction product stream can be passed through the cooling unit 20 and the refining unit 30 sequentially to remove gas by-products, water, and low-boiling point by-products.

The discharge stream from the refining unit 30 can include an acrylic acid, an unreacted lactic acid, and high-boiling point by-products. The content of the unreacted lactic acid in the discharge stream from the refining unit 30 varies with the conversion rate of a lactic acid which is changed depending on the reaction and process conditions in the reaction unit 10, and for example, can be 0.5 wt % or more, 2 wt % or more, or 5 wt % or more and 10 wt % or less, 15 wt % or less, or 20 wt % or less. As such, when the unreacted lactic acid is present in the reaction product, it should be recovered or removed in a separation process, but conventionally, it was difficult to recover the unreacted lactic acid and the unreacted lactic acid was removed with high-boiling point by-products in most cases, and in the present invention, the unreacted lactic acid is recovered at a high recovery rate to improve the economic feasibility of the process.

According to an exemplary embodiment of the present invention, the discharge stream from the refining unit 30 can be supplied to the acrylic acid separation column 100 to recover the lactic acid. Specifically, the acrylic acid separation column 100 can be for separating the acrylic acid from the reaction product, and recovering and reusing the unreacted lactic acid.

The operation conditions of the acrylic acid separation column 100 can be adjusted for increasing the separation efficiency in separating each component depending on the composition of the discharge stream from the refining unit 30.

The operation pressure of the acrylic acid separation column 100 can be 10 torr or more, 30 torr or more, or 50 torr or more and 80 torr or less, 100 torr or less, or 200 torr or less. When the acrylic acid separation column 100 is operated to the operation pressure in the above range, separation efficiency in separating each of the acrylic acid, the unreacted lactic acid, and the high-boiling point by-products in the acrylic acid separation column 100 can be high and a side reaction occurring at a high temperature can be suppressed.

The discharge stream from the refining unit 30 can be supplied to a stage at 40% or more, 50% or more, 60% or more, or 65% or more and 80% or less, 85% or less, or 90% or less with respect to the total number of stages of the acrylic acid separation column 100. Here, the total number of stages of the acrylic acid separation column 100 can be 10 to 70. For example, when the total number of stages of the acrylic acid separation column 100 is 100, a top stage can be a 1st stage and a bottom stage can be a 100th stage, and stages at 60% to 80% of the total number of stages of the acrylic acid separation column 100 can refer to 60th to 80th stages of the acrylic acid separation column 100. A supply stage of the discharge stream from the refining unit 30 which is supplied to the acrylic acid separation column 100 is controlled to the above range, thereby increasing the separation efficiency of the acrylic acid, the lactic acid, and the high-boiling point by-products in the acrylic acid separation column 100.

In the acrylic acid separation column 100, the acrylic acid can be separated from the upper discharge stream, the lactic acid can be separated from the side discharge stream, and the high-boiling point by-products can be separated from the lower discharge stream.

The side discharge stream from the acrylic acid separation column 100 can be discharged to a stage at 20% or more, 30% or more, 50% or more, or 55% or more and 70% or less, 75% or less, or 80% or less with respect to the total number of stages of the acrylic acid separation column 100. The discharge stage of the side discharge stream from the acrylic acid separation column 100 is controlled to the above range, thereby separating a high-purity unreacted lactic acid to the side and recovering it, and thus, a time that the lactic acid is exposed to a high temperature can be minimized and a loss of a lactic acid discharged to a lower portion with the high-boiling point by-products can be minimized.

The content of the unreacted lactic acid included in the side discharge stream from the acrylic acid separation column 100 can be 70% or more, 70% to 90%, or 75% to 90% of the content of the unreacted lactic acid included in the discharge stream from the refining unit 30. The unreacted lactic acid separated as the side discharge stream from the acrylic acid separation column 100 can be mixed with the lactic acid aqueous solution and supplied to the reaction unit 10. The unreacted lactic acid is recovered as the side discharge stream from the acrylic acid separation column 100 and reused in the reaction unit 10, thereby improving the economic feasibility of the process.

The upper discharge stream from the acrylic acid separation column 100 passes through a condenser, and a part of the stream is refluxed to the acrylic acid separation column 100 and an acrylic acid can be separated from the rest of the stream. In addition, a part of the lower discharge stream from the acrylic acid separation column 100 passes through a reboiler and is refluxed to the acrylic acid separation column 100, and high-boiling point by-products can be separated to the rest of the stream.

A flow rate ratio of the stream passing through the reboiler and being refluxed to the acrylic acid separation column 100 to the stream being not refluxed and separating the acrylic acid in the upper discharge stream from the acrylic acid separation column 100 can be 0.8 or more, 0.85 or more, or 0.95 or more and 1.3 or less, 1.4 or less, or 1.5 or less. As described above, the flow rate ratio of the stream passing through the lower reboiler and being refluxed to the stream being not refluxed and separating the acrylic acid in the upper discharge stream from the acrylic acid separation column 100 is controlled, thereby reducing a time that the unreacted lactic acid passes through the lower reboiler of the acrylic acid separation column 100 operated at a high temperature to prevent the progress of the oligomerization reaction of the lactic acid.

According to an exemplary embodiment of the present invention, in the method for preparing an acrylic acid, if necessary, devices such as a distillation column, a condenser, a reboiler, a valve, a pump, a separator, a mixer, and the like can be further installed.

Hereinabove, the method for preparing an acrylic acid according to the present invention has been described and illustrated in the drawings, but the description and the illustration in the drawings are the description and the illustration of only core constitutions for understanding of the present invention, and in addition to the process and devices described above and illustrated in the drawings, the process and the devices which are not described and illustrated separately can be appropriately applied and used for carrying out the method for preparing an acrylic acid according to the present invention.

Hereinafter, the present invention will be described in more detail by the examples. However, the following examples are provided for illustrating the present invention, and it is apparent to a person skilled in the art that various modifications and alterations can be made without departing from the scope and spirit of the present invention and the scope of the present invention is not limited thereto.

EXAMPLES

Example 1

According to the process flow diagram illustrated in FIG. 1, a process of preparing an acrylic acid was simulated, using an Aspen Plus simulator from Aspen Technology, Inc.

Specifically, a lactic acid aqueous solution and nitrogen ($N_2$) as a dilution gas were supplied to a reaction unit 10 to prepare a reaction product including an acrylic acid (AA) by a dehydration reaction. The discharge stream from the reaction unit 10 including the reaction product stream was supplied to a cooling unit 20 to remove gas by-products, and the reaction product from which the gas by-products were removed was supplied to a refining unit 30. Water and low-boiling point by-products were removed from the reaction product in the refining unit 30, and a discharge stream from the refining unit 30 from which water and low-boiling point by-products were removed was supplied to a 15th stage of an acrylic acid separation column 100 as stream 1. At this time, the total number of stages of the acrylic acid separation column 100 was 20.

The upper discharge stream from the acrylic acid separation column 100 was passed through a condenser, and a part of the stream was refluxed to the acrylic acid separation column 100 and an acrylic acid was separated from the rest of the stream as stream 2. In addition, a part of the lower discharge stream from the acrylic acid separation column 100 was passed through a reboiler and refluxed to the acrylic acid separation column 100, and high-boiling point by-products were separated from the rest of the stream as stream 3. In addition, a side discharge stream including an unreacted lactic acid was separated to a 13th stage of the acrylic acid separation column 100, and the side discharge stream 4 from the acrylic acid separation column 100 was mixed with the lactic acid aqueous solution and supplied to the reaction unit 10. At this time, a flow rate ratio of a stream passing through the reboiler and being refluxed to the acrylic acid separation column 100 to a stream being not refluxed and separating the acrylic acid in the upper discharge stream from the acrylic acid separation column 100 was controlled to 1.3.

The temperature, the pressure, and the flow rate (kg/hr) for each component in each stream are shown in the following Table 1:

TABLE 1

| | | 1 | 2 | 3 | 4 |
|---|---|---|---|---|---|
| Temperature (° C.) | | 90 | 77 | 133 | 97 |
| Pressure (torr) | | 760 | 70 | 70 | 70 |
| Mass flow rate (kg/hr) | Acrylic acid | 1022.5 | 1000.0 | 0.0 | 22.5 |
| | Lactic acid | 100.0 | 0.0 | 22.1 | 76.0 |
| | Lactic acid oligomer | 0.0 | 0.0 | 2.0 | 0.0 |
| | High-boiling point by-products | 30.0 | 0.0 | 30.0 | 0.0 |
| | Total | 1152.5 | 1000.0 | 54.1 | 98.5 |

Example 2

The process was performed in the same manner as in Example 1, except that the discharge stream from the refining unit 30 was supplied to a 10th stage of the acrylic acid separation column 100 and the side discharge stream including the unreacted lactic acid was separated to an 8th stage of the acrylic acid separation column 100.

At this time, the temperature, the pressure, and the flow rate (kg/hr) for each component in each stream (shown as 1, 2, 3, and 4 in FIG. 1) are shown in the following Table 2:

TABLE 2

| | | 1 | 2 | 3 | 4 |
|---|---|---|---|---|---|
| Temperature (° C.) | | 90 | 77 | 133 | 97 |
| Pressure (torr) | | 760 | 70 | 70 | 70 |
| Mass flow rate (kg/hr) | Acrylic acid | 1022.5 | 999.6 | 0.0 | 22.9 |
| | Lactic acid | 100.0 | 0.4 | 22.1 | 75.6 |
| | Lactic acid oligomer | 0.0 | 0.0 | 2.0 | 0.0 |
| | High-boiling point by-products | 30.0 | 0.0 | 30.0 | 0.0 |
| | Total | 1152.5 | 1000.0 | 54.1 | 98.5 |

COMPARATIVE EXAMPLES

Comparative Example 1

According to the process flow diagram illustrated in FIG. 2, a process of preparing an acrylic acid was simulated, using an Aspen Plus simulator from Aspen Technology, Inc.

Specifically, a lactic acid aqueous solution and nitrogen ($N_2$) as a dilution gas were supplied to a reaction unit to prepare a reaction product including an acrylic acid (AA) by a dehydration reaction. The discharge stream from the reaction unit including the reaction product stream was supplied to a cooling unit to remove gas by-products, and the reaction product from which the gas by-products were removed was supplied to a refining unit. Water and low-boiling point by-products were removed from the reaction product in the refining unit, and a discharge stream 1 from the refining unit from which water and low-boiling point by-products were removed was supplied to a 3rd stage of an acrylic acid separation column 100. At this time, the total number of stages of the acrylic acid separation column 100 was 10.

The upper discharge stream from the acrylic acid separation column 100 was passed through a condenser, and a part of the stream was refluxed to the acrylic acid separation column 100 and an acrylic acid was separated from the rest of the stream as stream 2. In addition, a part of the lower discharge stream from the acrylic acid separation column 100 was passed through a reboiler and refluxed to the acrylic acid separation column 100, and high-boiling point by-products and an unreacted lactic acid were separated from the rest of the stream as stream 3 and supplied to a lactic acid recovery column 200.

The upper discharge stream from the lactic acid recovery column 200 was passed through a condenser, and a part of the stream was refluxed to the lactic acid recovery column 200 and the unreacted lactic acid was recovered from the rest of the stream as stream 4. In addition, a part of the lower discharge stream from the lactic acid recovery column 200 was passed through a reboiler and refluxed to the lactic acid recovery column 200, and high-boiling point by-products were separated from the rest of the stream as stream 5. The lactic acid recovered from the upper discharge stream from the lactic acid recovery column 200 was mixed with the lactic acid aqueous solution and supplied to the reaction unit.

The temperature, the pressure, and the flow rate (kg/hr) for each component in each stream (shown as 1, 2, 3, 4, and 5 in FIG. 2) are shown in the following Table 3:

TABLE 3

| | | 1 | 2 | 3 | 4 | 5 |
|---|---|---|---|---|---|---|
| Temperature (° C.) | | 90 | 90 | 117 | 97 | 133 |
| Pressure (torr) | | 760 | 120 | 120 | 70 | 70 |
| Mass flow rate (kg/hr) | Acrylic acid | 1022.5 | 998.1 | 24.4 | 24.4 | 0.0 |
| | Lactic acid | 100.0 | 1.9 | 96.1 | 72.6 | 21.6 |
| | Lactic acid oligomer | 0.0 | 0.0 | 2.0 | 0.0 | 3.9 |
| | High-boiling point by-products | 30.0 | 0.0 | 30.0 | 0.0 | 30.0 |
| | Total | 1152.5 | 1000.0 | 152.5 | 97.0 | 55.5 |

Referring to Tables 1 to 3, in Examples 1 and 2 in which the unreacted lactic acid was recovered from the reaction product by the method for preparing an acrylic acid according to the present invention, it was confirmed that the purity of the acrylic acid was 99.9% to 100%, and the recovery rate of the lactic acid was 75% or more. In particular, in Example 1 in which the supply stage of the discharge stream from the refining unit 30 was controlled to a stage at 65% to 85% of the total number of stages of the acrylic acid separation column 100, the discharge stage of the side discharge stream from the acrylic acid separation column 100 was controlled to a stage at 55% to 75%, and the flow rate ratio of the stream passing through the reboiler and being refluxed to the acrylic acid separation column 100 to the stream being not refluxed and separating the acrylic acid in the upper discharge stream from the acrylic acid separation column 100 was controlled to 1 to 1.5, it was confirmed that the purity of the acrylic acid reached 100%, and the recovery rate of the lactic acid was higher.

In comparison, in Comparative Example 1, which was conventionally arbitrarily designed for recovering the unreacted lactic acid discharged with the high-boiling point by-products in the lower portion of the acrylic acid separation column 100, the lower discharge stream from the acrylic acid separation column 100 was supplied to the lactic acid separation column at the rear end and the lactic acid was recovered in the lactic acid separation column, thereby increasing the amount of exposure time to a high temperature in a high concentration state to increase an equilibrium reaction rate, for example, discharging the high concentration of the unreacted lactic acid at a high temperature from the lower portion of the acrylic acid separation column 100 and heating the unreacted lactic acid again in the column at the rear end, and thus, the oligomerization reaction of a lactic acid was promoted to lower the recovery rate of the unreacted lactic acid, and additional energy was used.

The invention claimed is:

1. A method for preparing an acrylic acid, the method comprising:
   dehydrating a lactic acid aqueous solution in a reaction unit to prepare a reaction product stream;
   passing the reaction product stream through a cooling unit and a refining unit sequentially and supplying a discharge stream from the refining unit to an acrylic acid separation column; and
   separating an unreacted lactic acid as a side discharge stream and separating the acrylic acid as an upper discharge stream in the acrylic acid separation column.

2. The method of claim 1, wherein the discharge stream from the refining unit is supplied to a stage at 40% to 90% with respect to the total number of stages of the acrylic acid separation column.

3. The method of claim 1, wherein the discharge stream from the refining unit is supplied to a stage at 65% to 85% with respect to the total number of stages of the acrylic acid separation column.

4. The method of claim 1, wherein the side discharge stream from the acrylic acid separation column is discharged from a stage at 20% to 80% respect to the total number of stages of the acrylic acid separation column.

5. The method of claim 1, wherein the side discharge stream from the acrylic acid separation column is discharged from a stage at 55% to 75% respect to the total number of stages of the acrylic acid separation column.

6. The method of claim 1, wherein an operation pressure of the acrylic acid separation column is 10 torr to 200 torr.

7. The method of claim 1, wherein a flow rate ratio of a stream passing through a reboiler and being refluxed to the acrylic acid separation column to a stream being not refluxed and separating the acrylic acid in the upper discharge stream from the acrylic acid separation column is 0.8 to 1.5.

8. The method of claim 1, wherein the unreacted lactic acid separated as the side discharge stream from the acrylic acid separation column is mixed with the lactic acid aqueous solution and supplied to the reaction unit.

9. The method of claim 1, wherein high-boiling point by-products are separated from a lower discharge stream from the acrylic acid separation column.

10. The method of claim 1, wherein the reaction product stream includes the acrylic acid, water, gas by-products, low-boiling point by-products, high-boiling point by-products, and the unreacted lactic acid.

11. The method of claim 10, wherein the cooling unit removes the gas by-products from the reaction product stream and the refining unit removes water and the low-boiling point by-products from the reaction product stream.

\* \* \* \* \*